United States Patent
Ielceanu et al.

(10) Patent No.: US 9,141,349 B2
(45) Date of Patent: Sep. 22, 2015

(54) VISUAL DEVELOPMENT ENVIRONMENT FOR IMPLEMENTING LOGIC MODULES

(71) Applicant: TIBCO Software Inc., Palo Alto, CA (US)

(72) Inventors: Sabin S. Ielceanu, Los Gatos, CA (US); Thomas W. Hillman, Edmonds, WA (US); Yang Yang, San Jose, CA (US)

(73) Assignee: TIBCO Software Inc., Palo Alto, CA (US)

( * ) Notice: Subject to any disclaimer, the term of this patent is extended or adjusted under 35 U.S.C. 154(b) by 0 days.

(21) Appl. No.: 14/479,090

(22) Filed: Sep. 5, 2014

(65) Prior Publication Data

US 2015/0106785 A1    Apr. 16, 2015

Related U.S. Application Data

(60) Provisional application No. 61/890,094, filed on Oct. 11, 2013.

(51) Int. Cl.
*G06F 9/44* (2006.01)
*G06F 11/07* (2006.01)
*G06F 11/36* (2006.01)

(52) U.S. Cl.
CPC *G06F 8/34* (2013.01); *G06F 11/07* (2013.01); *G06F 11/3612* (2013.01)

(58) Field of Classification Search
CPC ............... G06F 8/30; G06F 8/33; G06F 8/34; G06F 11/3612

USPC .......................................................... 717/113
See application file for complete search history.

(56) References Cited

U.S. PATENT DOCUMENTS

| | | | |
|---|---|---|---|
| 7,188,317 B1 * | 3/2007 | Hazel | 715/804 |
| 8,103,742 B1 * | 1/2012 | Green | 709/218 |
| 2005/0027822 A1 * | 2/2005 | Plaza | 709/218 |
| 2011/0029955 A1 * | 2/2011 | McKaskle et al. | 717/125 |
| 2011/0093836 A1 * | 4/2011 | Galicia et al. | 717/139 |
| 2012/0278750 A1 * | 11/2012 | Abraham et al. | 715/779 |
| 2015/0007105 A1 * | 1/2015 | Li et al. | 715/804 |

OTHER PUBLICATIONS

Beaudet et al., "Dynamically Linking and Managing Windows," IPCOM000114947D, 1995, 7pg.*
Cundiff et al., "Method and Apparatus for Linking Based on X Windows," IPCOM000117711D, 1996, 9pg.*
Seubert et al., "The Role of IBM System z in the Design of a Service-Oriented Architecture," IBM Redbooks, 2006, 44pg.*

* cited by examiner

*Primary Examiner* — Ryan Coyer
(74) *Attorney, Agent, or Firm* — Baker & McKenzie LLP

(57) ABSTRACT

Logic modules may be developed to automate or simplify a variety of business tasks and applications. For example, a logic module of a shopping cart process may be developed to handle transactions between an online retail service and online shoppers. As the complexity of logic modules increases, the developmental time and cost can also increase. Accordingly, developers may utilize a visual development environment to simplify logic module design. Provided are exemplary techniques for improving visual development environments, which can in turn increase the efficiency of logic module development.

20 Claims, 13 Drawing Sheets

VISUAL DEVELOPMENT ENVIRONMENT FOR IMPLEMENTING LOGIC MODULES

INCORPORATION BY REFERENCE

This application claims priority from U.S. Patent Application No. 61/890,094, filed on Oct. 11, 2013 entitled "Visual development environment for implementing logic modules," the contents of which are hereby incorporated by reference in their entirety for all purposes.

BRIEF SUMMARY

Enclosed is a detailed description of a framework and visual development environment that enables the efficient development of logic modules that may be instantiated on servers. The visual development environment increases developer productivity through the structured presentation of logic within said logic modules.

BRIEF DESCRIPTION OF THE DRAWINGS

Features, aspects, and embodiments of the disclosure are described in conjunction with the attached drawings, in which.

These exemplary figures and embodiments are to provide a written, detailed description of the subject matter set forth by any claims that issue from the present application. These exemplary figures and embodiments should not be used to limit the scope of any such claims.

Further, although similar reference numbers may be used to refer to similar structures for convenience, each of the various example embodiments may be considered to be distinct variations.

DETAILED DESCRIPTION

Figure 1:
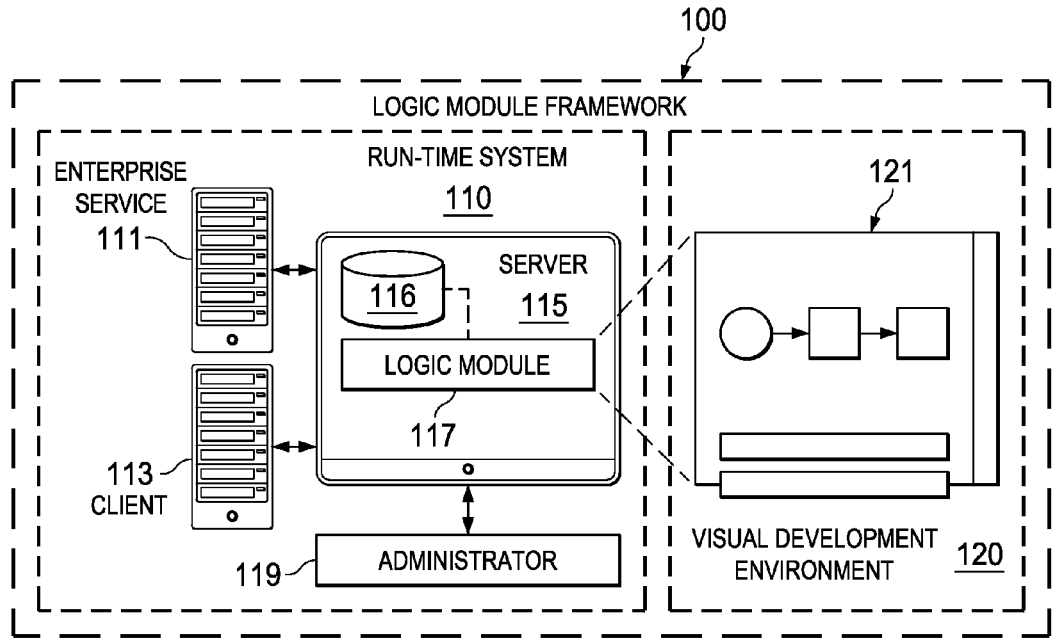
FIG. 1 is a schematic diagram illustrating a logic module framework in accordance with the present disclosure.

FIG. 1 is a schematic diagram illustrating a logic module framework 100 in accordance with the present disclosure. The logic module framework 100 provides for the development of a run-time system 110 that enables enterprise services 111 to be connected to clients 113. An example of an enterprise service would be an online retail service (covered in further detail in the description of FIG. 2). The logic module framework bridges the connection between the enterprise services 111 and the clients 113 by utilizing logic modules 117 that may be instantiated on servers 115 based on instructions encoded in machine-readable media 116. The logic modules 117 may comprise business processes that provide functionality and connectivity beneficial to the operation of enterprises. Administrators 119 may connect to the servers to monitor activity and exert control over other elements of the run-time system 110 as necessary.

The run-time system 110 may include a plurality of any of the presented elements. The schematic diagram of FIG. 1 includes a single one of each element for the purpose of simplicity.

The logic module framework 100 allows developers to design the logic modules 117 by utilizing a visual development environment 120. Within the visual development environment 120, developers may create and modify scopes 121 that are design-time constructs as well as run-time constructs that are part of the logic modules 117. For example, the scopes may comprise design-time representations of primary and secondary logic, as described below with respect to FIGS. 3-16.

Figure 1A:
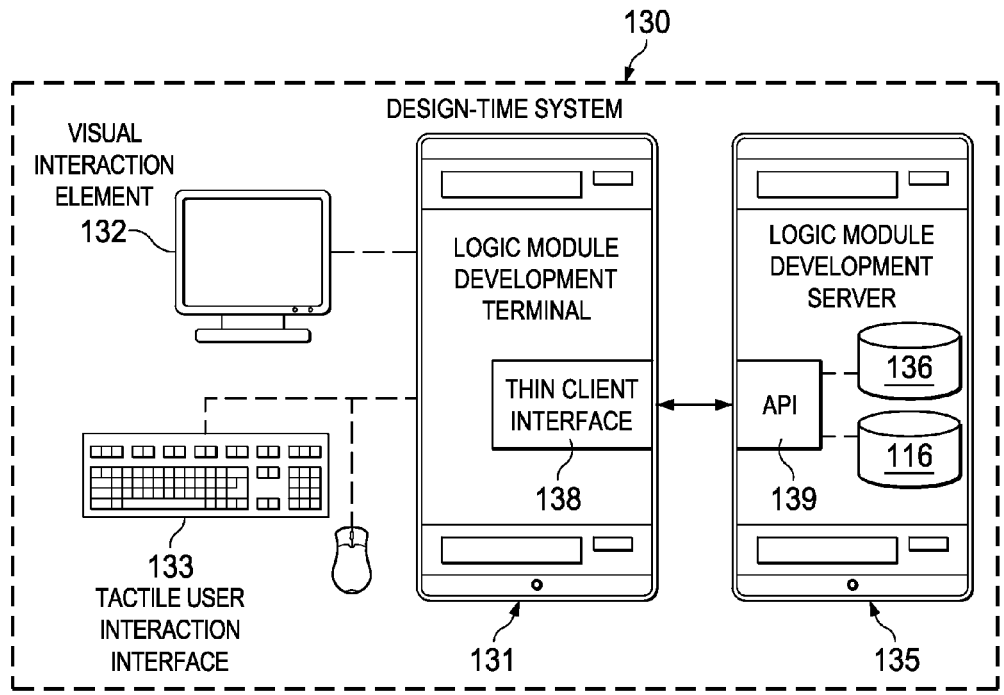
FIG. 1a is a schematic diagram illustrating a design-time system for implementing a visual development environment.

FIG. 1a is a schematic diagram illustrating a design-time system 130 for implementing a visual development environment. A developer may interact with the visual development environment through a logic module development terminal 131 to develop one or more logic modules. The development terminal 131 may present the visual development environment to the developer through a visual interaction element 132. The development terminal 131 may also receive input from the developer through a tactile user interaction interface 133. For example, the tactile user interaction interface 133 may comprise a keyboard and a mouse that together enable the developer to interact with the visual development environment. Other input devices may be additionally or alternatively be employed, such as touchscreens, touchpads, styluses, and/or non-tactile devices such as microphones (e.g., for voice-based commands) or video cameras (e.g., for gesture-based commands).

In some embodiments, the logic module development terminal 131 may communicate with a logic module development server 135 prior to, while, and/or after a developer designs a logic module using the visual development environment. For example, the development server 135 may comprise an application programming interface (API) 139 for interaction with a thin client interface 138 associated with the development terminal 131. Through the API 139, the development server 135 may provide one or more development terminals 131 with controlled read and/or write access to the machine-readable media 116, which, as described in FIG. 1, may contain instructions for instantiating logic modules in a run-time system. The API 139 may also allow instances of the visual development environment to be instantiated at one or more development terminals 131.

The API 139 may be encoded in machine-readable media 136. As a result, a given instance of the visual development environment may be enabled and stored, at least in part, by the machine-readable media 136. In some embodiments an instance of the visual development environment may be enabled and stored, at least in part, by local machine-readable media associated with a development terminal 131.

As indicated in the figure, design-time packets may be bi-directionally transferred between the development terminal 131 and the development server 135 through a communications channel. The design-time packets may be interpreted by the development terminal 131 to render and display design-time representations of primary and secondary logic to the developer via the visual interaction element 132. The development terminal 131 may also send design-time packets back to the development server 135 as feedback (e.g., based on inputs received by the tactile user interaction interface 133).

In some embodiments, the development server 135 may be a virtual server that is fully integrated with (or instantiated on) the development terminal 131. This allows a developer to interact with a visual development environment and to develop logic modules even when the associated development terminal 131 is not connected to a communications channel or network.

When development of a logic module is completed, machine-interpretable instructions for instantiating, deploying, and/or otherwise running the logic module may be stored in the machine-readable media 116. As described above, these instructions may be executed within a run-time system. In some embodiments, even after instructions representing completed logic modules are stored on the machine-readable media 116, the instructions may be retrieved (e.g., via the thin client interface 138 in the form of design-time packets) and further modified through the development terminal 131.

In some embodiments, the development terminal 131 stores and retrieves instructions representing logic modules to and from a different machine-readable media than is used within the run-time system. For example, the development terminal 131 may locally store instructions for instantiating, deploying, and/or otherwise running the logic modules. In these embodiments, instructions representing completed logic modules may be automatically or manually transferred from media in the design-time system to media in the run-time system. For example, a developer may routinely transfer (e.g., commit) instructions representing completed logic modules from the media associated with the design-time system to the media associated with the run-time system. The storing, retrieving, and modifying of the instructions representing logic modules may be enabled or otherwise facilitated by the visual development environment.

Figure 2:
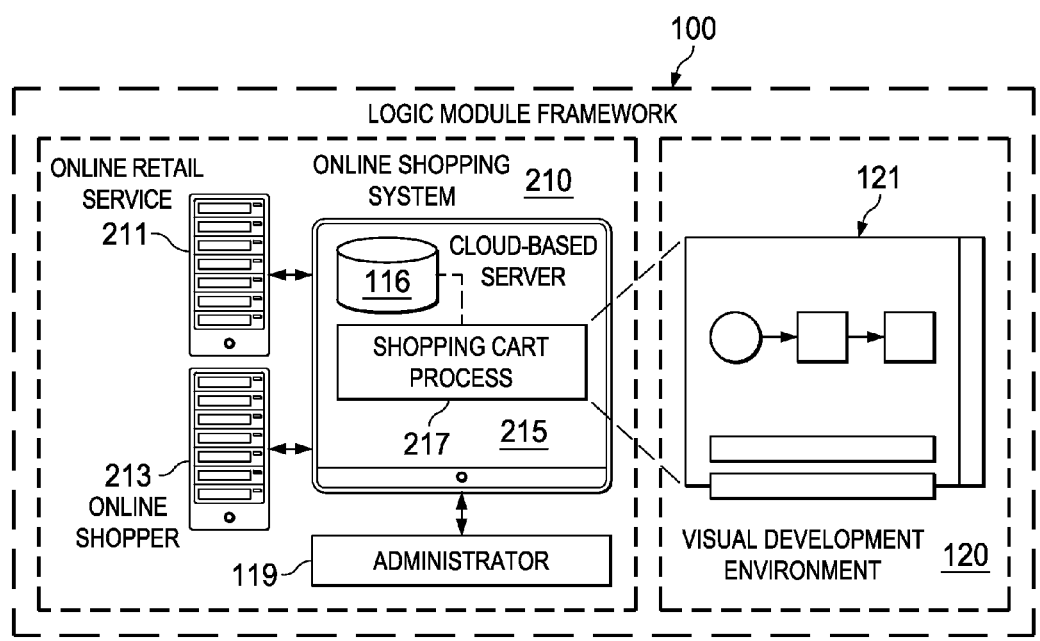
FIG. 2 is a schematic diagram illustrating an embodiment relating to an online shopping system.

FIG. 2 is a schematic diagram illustrating an embodiment relating to an online shopping system 210 wherein a retailer may provide an online retail service 211 to an online shopper 213. The logic module framework 100 promotes a streamlined process for managing the online shopper's experience. In the present embodiment, a shopping cart process 217 is instantiated on a cloud-based server 215 based on instructions encoded in machine-readable media 116 to manage the shopper's interactions with the online retail service 211. The shopping cart process 217 essentially acts as a virtual shopping cart that is tied to a shopper's online session.

After browsing the retailer's website, the shopper 213 may desire to purchase one or more items presented on the website. The shopper's actions on the retail website may be sent to the cloud-based server 215 via HTTP POST commands. The first of these commands may instruct the cloud-based server 215 to instantiate the shopping cart process 217. While the online shopper 213 is shopping online, various other actions may be sent to the server 215 and passed to the shopping cart process 217, where they may be interpreted. In this embodiment, such actions may include adding items to the virtual shopping cart, removing items from the virtual shopping cart, and "checking out" and paying for the items within the virtual shopping cart. The shopping cart process 217 may communicate with the online retail service 211 as required to ensure that the decisions of the online shopper 213 are properly interpreted and handled. When the online shopper 213 requests to complete the purchase, the shopping cart process 217 ensures that the online retail service 211 receives the final order. In this way, the shopping cart process 217 handles the entire transaction between the online shopper 213 and the online retail service 211.

The online shopping system 210 may have a mechanism to deactivate a given instance of the shopping cart process 217 when the respective transaction is completed. This may unlock computational resources for other logic modules 217. Multiple shopping cart processes 217 may be running at a given instant in time such that the online shopping system 210 may service the requests of multiple online shoppers 213 simultaneously. The selection of a cloud-based server 215 for this task may increase scalability.

As described above, logic modules such as the shopping cart process 217 are key components of various run-time systems, and the present disclosure describes both systems and methods to develop said logic modules using a visual development environment 120.

Figure 3:
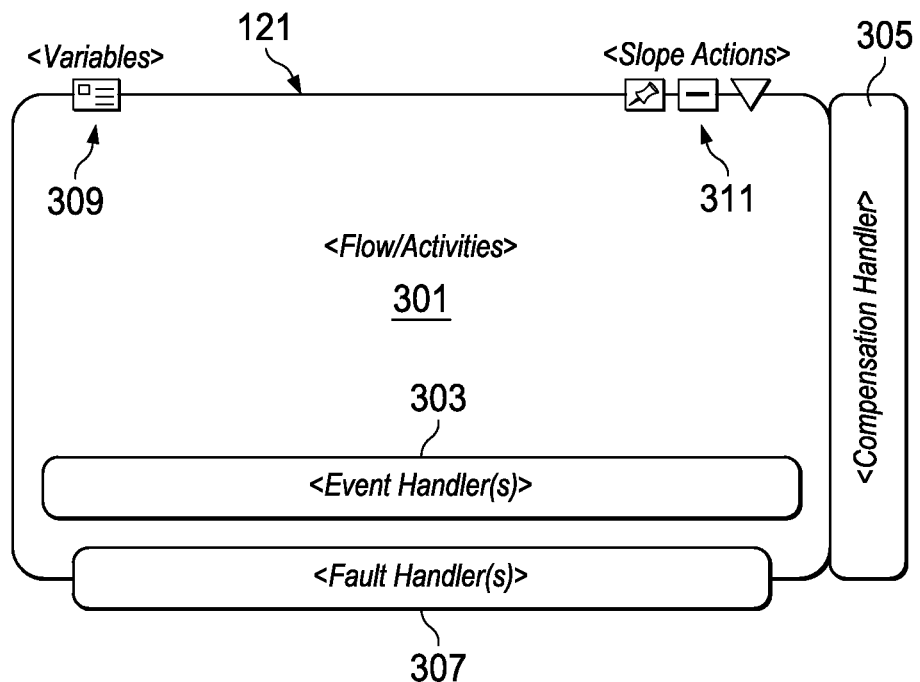
FIG. 3 is a schematic diagram illustrating a scope.

FIG. 3 is a schematic diagram illustrating a scope 121. A developer may be presented with one or more scopes 121 within the visual development environment. The scope is a design-time representation of a logic module or a component of a logic module that may be instantiated in a run-time system on a server. The central area 301 of the scope may provide a workspace for a developer to design the primary activities, logic or flow of the logic module under development. The scope 121 may include an icon 309 that provides access to variables locally defined within the scope 121 when selected. This icon may only appear after local variables have been defined. Additional icons 311 may also be presented to the developer. These icons 311 may allow the developer to lock the position of the scope 121 within the visual development environment or to minimize the scope 121. These icons 311 may also allow the developer to view a menu bar that presents the developer with additional actions associated with the scope 121. In some embodiments, the additional actions may include deleting the scope 121.

The scope 121 may include one or more event handler windows 303 that may appear when one or more event handlers is defined and associated with the scope. These event handler windows 303 may appear within the bottom portion of the scope 121. The event handler windows 303 may be at least partially transparent unless the developer focuses on the associated regions. The event handler windows 303 may also be shown as minimized, unless the developer elects to expand them.

The event handlers described within event handler windows 303 may be triggered by events. Upon triggering, the event handlers may perform activities or logic similar to the primary logic of the scope 121 within the central area 301. These activities may conditionally be carried out synchronously or asynchronously with the primary activities of the logic defined in the scope 121, depending on the nature of these activities. The triggering events may include user (client) interactions, timers, or any other events that may be detected or passed to the logic module under development.

The scope 121 may include one or more fault handler windows 307 that may similarly be at least partially transparent unless the developer focuses on the associated regions. The fault handler windows 307 may be visually presented as hanging off from the scope 121. Fault handlers windows 307 may also be shown as minimized, unless the developer elects to expand them. Fault handlers may be triggered by various faults, and upon triggering, fault handlers may execute logic.

The scope 121 may include a compensation handler window 305, which is shown as attached (i.e. adjunct) to the scope 121. This window 305 may be maximized in a manner similar to the central area 301 of the scope 121. The compensation handler associated with the compensation handler window provides a mechanism for compensating, or undoing certain elements of the primary logic of the scope 121. As an example, if the primary logic dictates creating a file, the logic within the compensation handler may delete that file from a file system such that the run-time construct associated with the scope 121 may deactivate without leaving behind artifacts or unreleased resources.

During the development process, developers may need access the primary logic of a critical path without being distracted by secondary logic such as fault handling and compensation logic. The visual representation of the scope 121 intentionally allows the developer to focus on the primary logic when so desired. The impact is significant when a developer is trying to create a complex logic module using multiple scopes 121 and/or scopes 121 that may be nested within one another.

Figure 4:
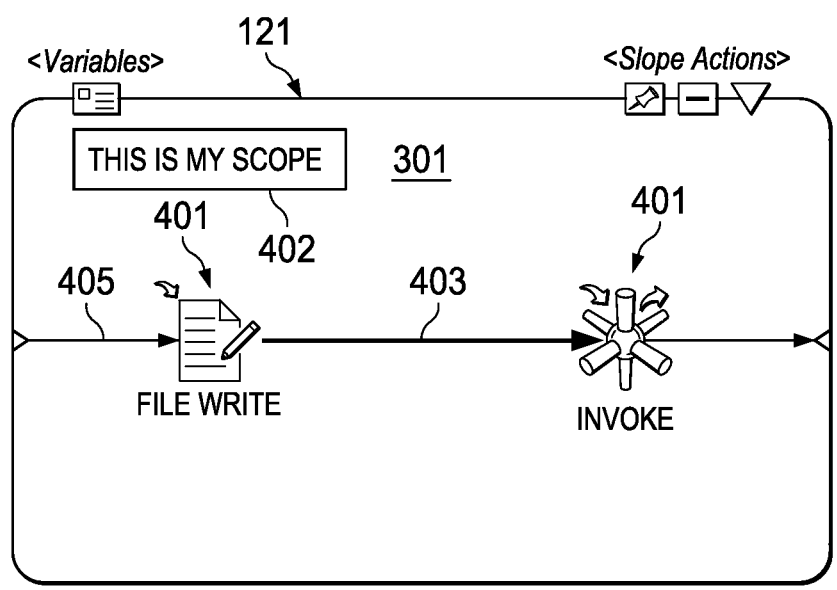
FIG. 4 is a schematic diagram illustrating a scope without handlers.

FIG. 4 is a schematic diagram illustrating a scope 121 without handlers. The scope may display logic representations 401 within the central area 301. The scope 121 may contain a name plate 402 that may display a name for a given scope 121. The scope may display the critical path with explicit segments 403 and implicit segments 405. The implicit segments 405 may be automatically drawn by the visual development environment. The implicit segments 405 may alternatively be hidden, based on developer preference. If the implicit segments 405 are displayed, they may be displayed differently than the explicit segments 403. For example, the implicit segments may be a different color than the explicit segments 403. In FIG. 4, the implicit segments 405 are displayed less prominently than the explicit segments 403.

Figure 5A:
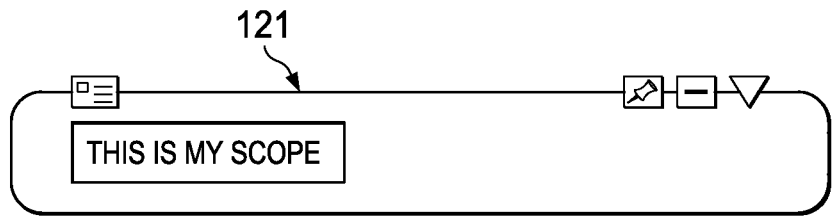
FIG. 5a is a schematic diagram illustrating a minimized scope without handlers.

As logic module complexity increases, developers may find themselves requiring several scopes. In some embodiments, the central area of individual scopes may be minimized by the developer. This effectively minimizes the scope itself, although a compensation handler window associated with that scope may still remain visible. FIG. 5a is a schematic diagram illustrating a minimized scope 121 without handlers.

Figure 5B:
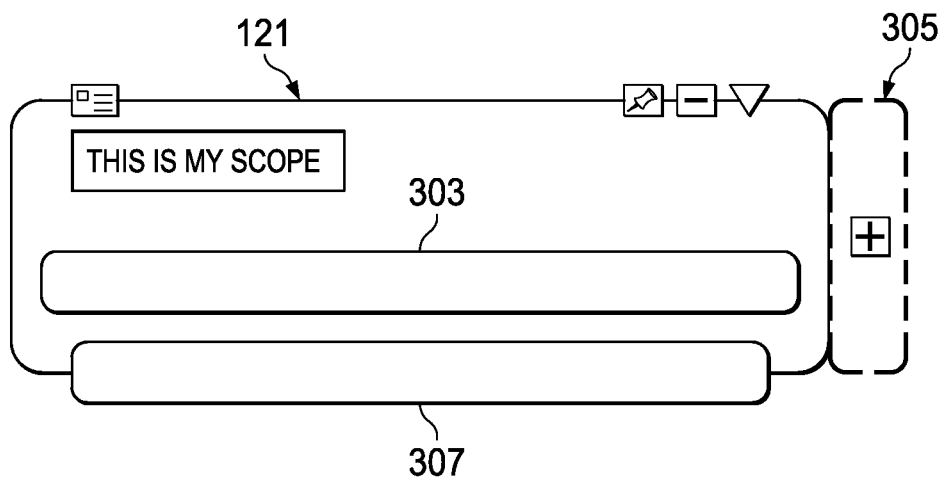
FIG. 5b is a schematic diagram illustrating a minimized scope with minimized handler windows.

FIG. 5b is a schematic diagram illustrating a minimized scope 121 with minimized handler windows. The event handler window 303, the compensation handler window 305 and the fault handler window 307 may be maximized when the developer moves a mouse over the respective areas.

Figure 5C:
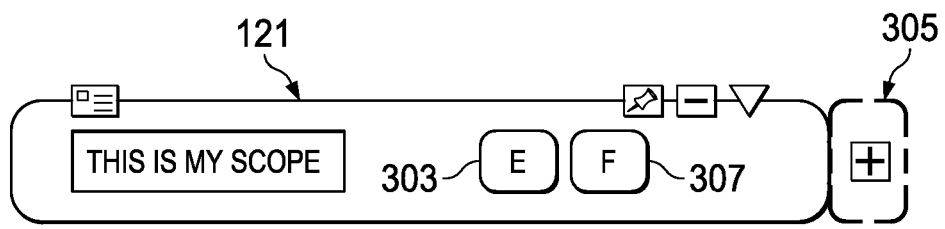
FIG. 5c is another schematic diagram illustrating a minimized scope with minimized handler windows.

FIG. 5c is another schematic diagram illustrating a minimized scope 121 with minimized handler windows that may be presented to developers. This view may be selected by developers instead of the view of FIG. 5b.

Figure 6:
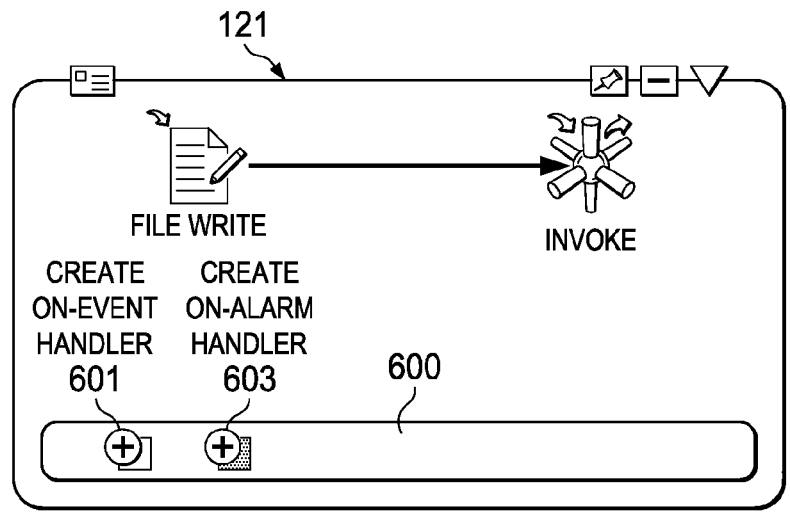
FIG. 6 is a schematic diagram illustrating a scope demonstrating the creation of event handlers.

FIG. 6 is a schematic diagram illustrating a scope 121 demonstrating the creation of event handlers. The event handler creation window 600 may only appear when the developer moves a mouse over the respective area. When this window is visible, a developer may select icon 601 to create an on-event handler. As the name suggests, an on-event handler may trigger upon an event such as user (client) interaction. Icon 603 may be selected to create an on-alarm handler. The on-alarm handler may trigger upon an alarm set by a timer. For example, this type of event handler may be set to trigger once every 5 minutes, while the associated logic module is active.

Figure 7:
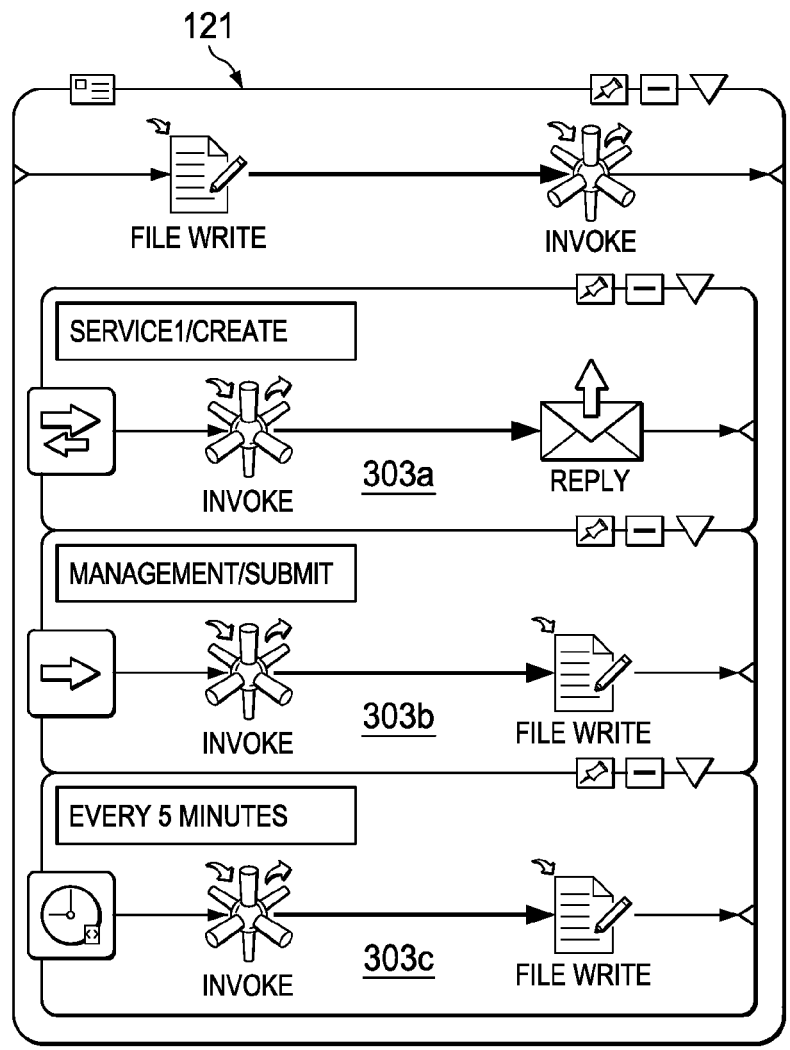
FIG. 7 is a schematic diagram illustrating a scope with three event handler windows.

FIG. 7 is a schematic diagram illustrating a scope 121 with three event handler windows 303a-303c. Event handler windows 303a and 303b may represent on-event handlers and event handler window 303c may represent an on-alarm handler.

Figure 8:
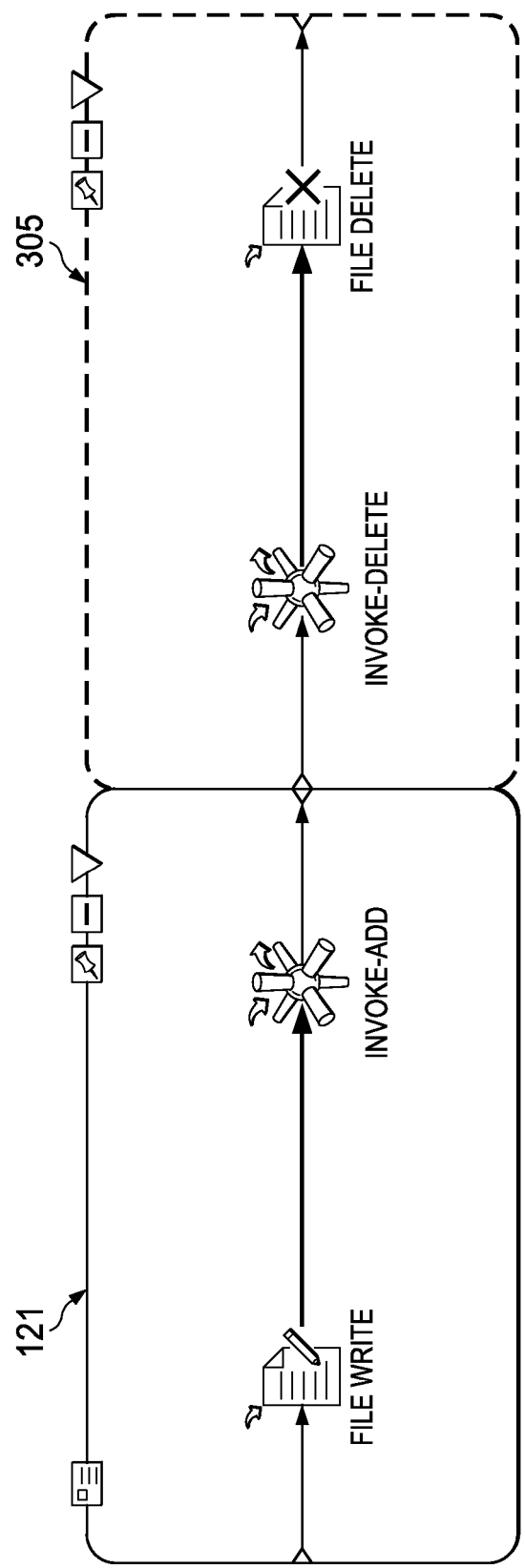
FIG. 8 is a schematic diagram illustrating a scope with a compensation handler window.

FIG. 8 is a schematic diagram illustrating a scope 121 with a compensation handler window 305. The primary logic within the central area of the scope 121 may be compensated, at least in part, with the compensation logic within the compensation handler window 305. For example, as shown in the figure, if the primary logic involves writing a file, the compensation logic may involve deleting that file. Accordingly, the file need not take up resources on a server after the primary logic and the related compensation logic are executed. The compensation logic may occur while the run-time construct associated with the scope 121 is deactivated.

Figure 9:
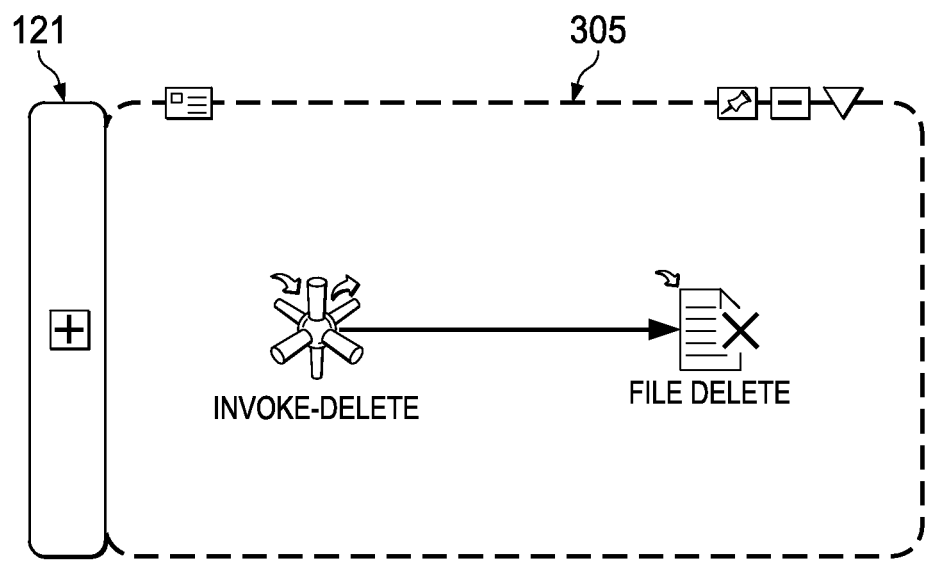
FIG. 9 is a schematic diagram illustrating a minimized scope with an open compensation handler window.

FIG. 9 is a schematic diagram illustrating a minimized scope 121 with an open compensation handler window 305.

Figure 10:
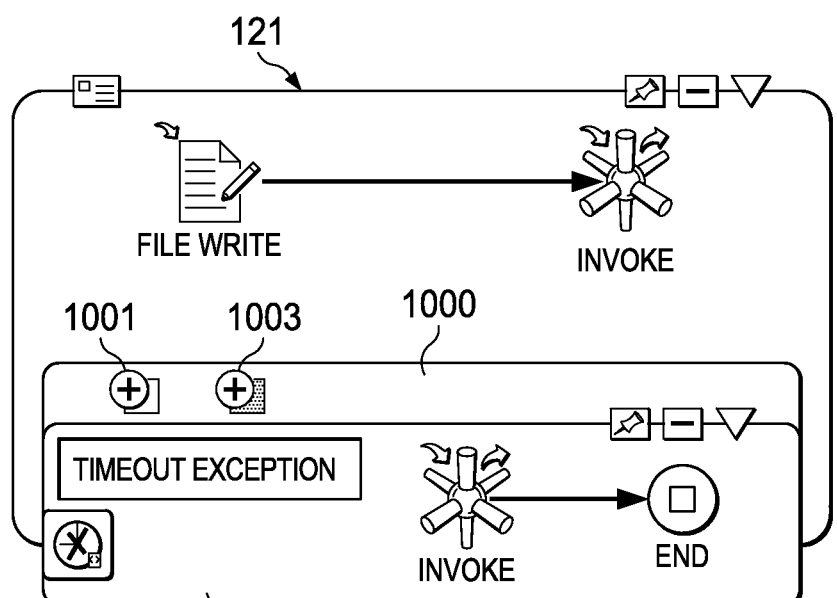
FIG. 10 is a schematic diagram illustrating a scope with a fault handler window and a fault handler creation window.

FIG. 10 is a schematic diagram illustrating a scope 121 with a fault handler window 307 and a fault handler creation window 1000. The fault handler creation window 1000 may become visible when a developer moves a mouse over the associated area. When the fault handler creation window 1000 is open, the developer may see icon 1001 for creating a new catch fault handler and icon 1003 for creating a new catch-all fault handler. The catch fault handler may trigger on one or more faults determined by the developer. The catch-all fault handler may trigger on all faults that are not caught by existing catch fault handlers associated with the scope 121.

Figure 11:
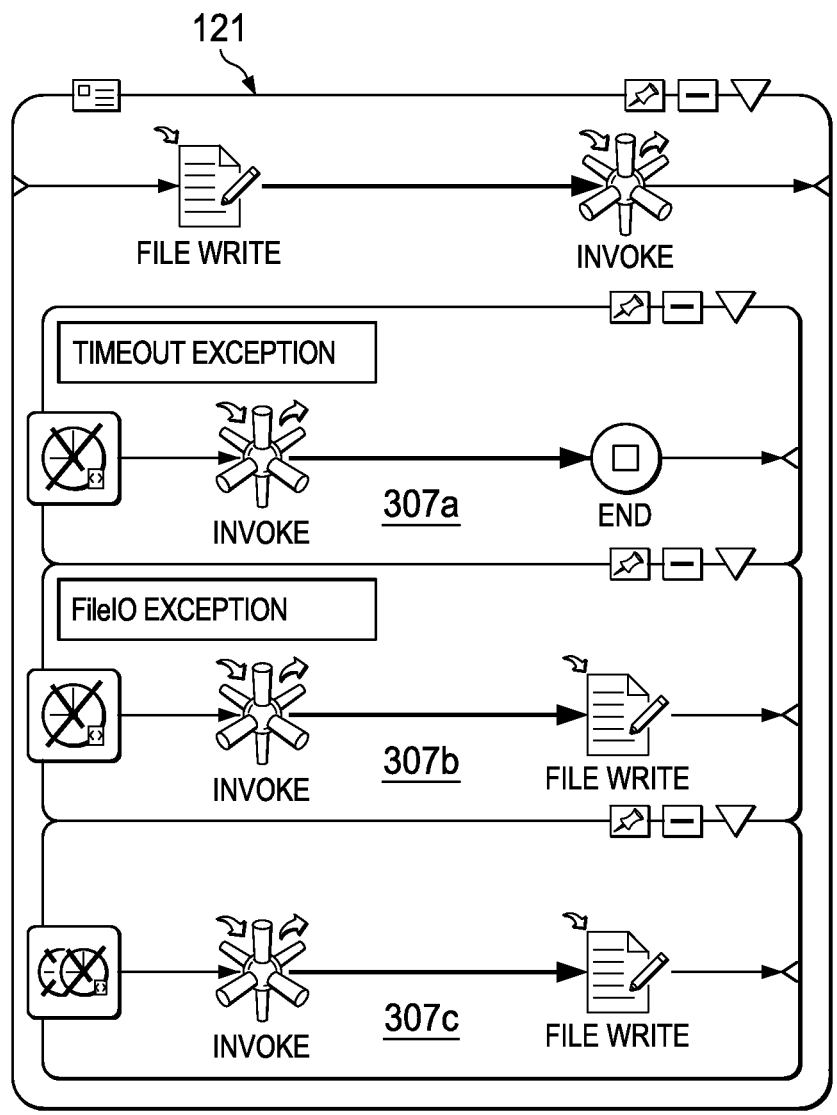
FIG. 11 is a schematic diagram illustrating a scope with three fault handler window.

FIG. 11 is a schematic diagram illustrating a scope 121 with three fault handler window 307a-307c. Fault handler windows 307a and 307b represent catch fault handlers. Fault handler window 307c represents a catch-all fault handler.

Figure 12:
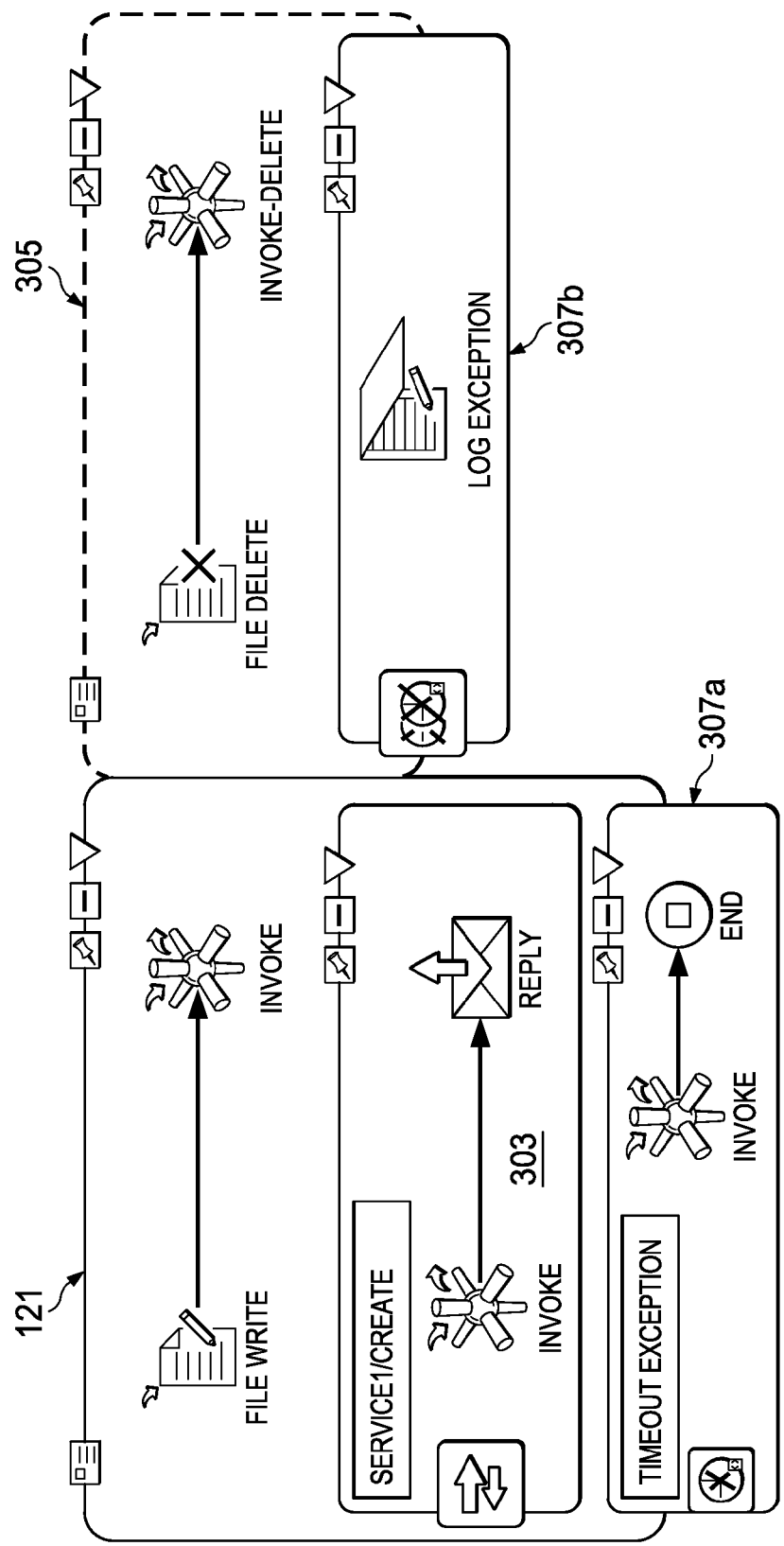
FIG. 12 is a schematic diagram illustrating a scope with a compensation window.

FIG. 12 is a schematic diagram illustrating a scope 121 with a compensation window 305. In this example, both the scope 121 and the compensation handler window 305 have their own fault handler windows 307a and 307b, respectively.

Figure 13:
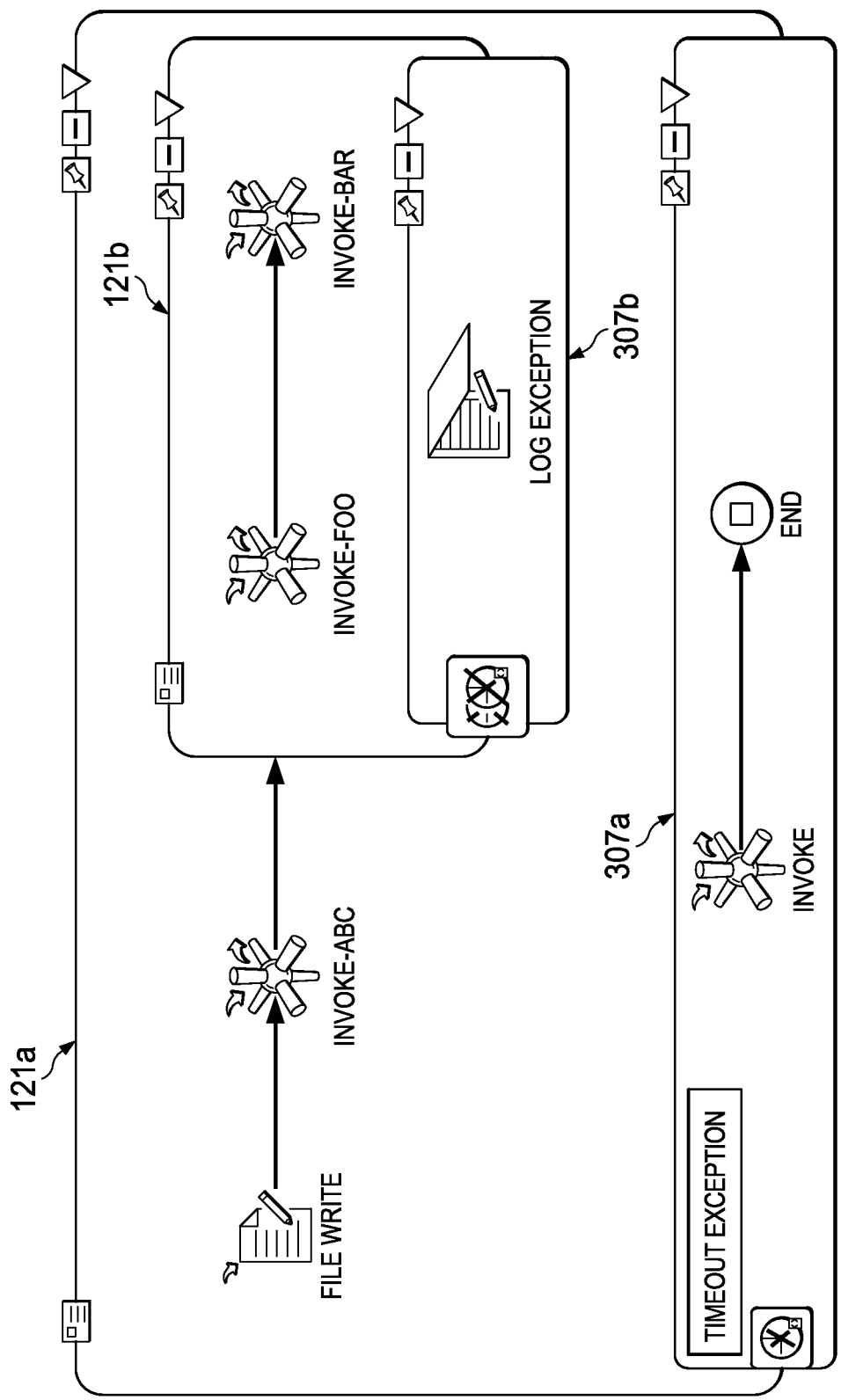
FIG. 13 is a schematic diagram illustrating a scope nested within another scope.

FIG. 13 is a schematic diagram illustrating a scope 121b nested within another scope 121a. Scope 121b may have a fault handler window 307a, and scope 121b may have its own fault handler window 307b. This example demonstrates that scopes 121 may be nested inside other scopes 121. This functionality enables the development of highly complex logic modules.

Figure 14:
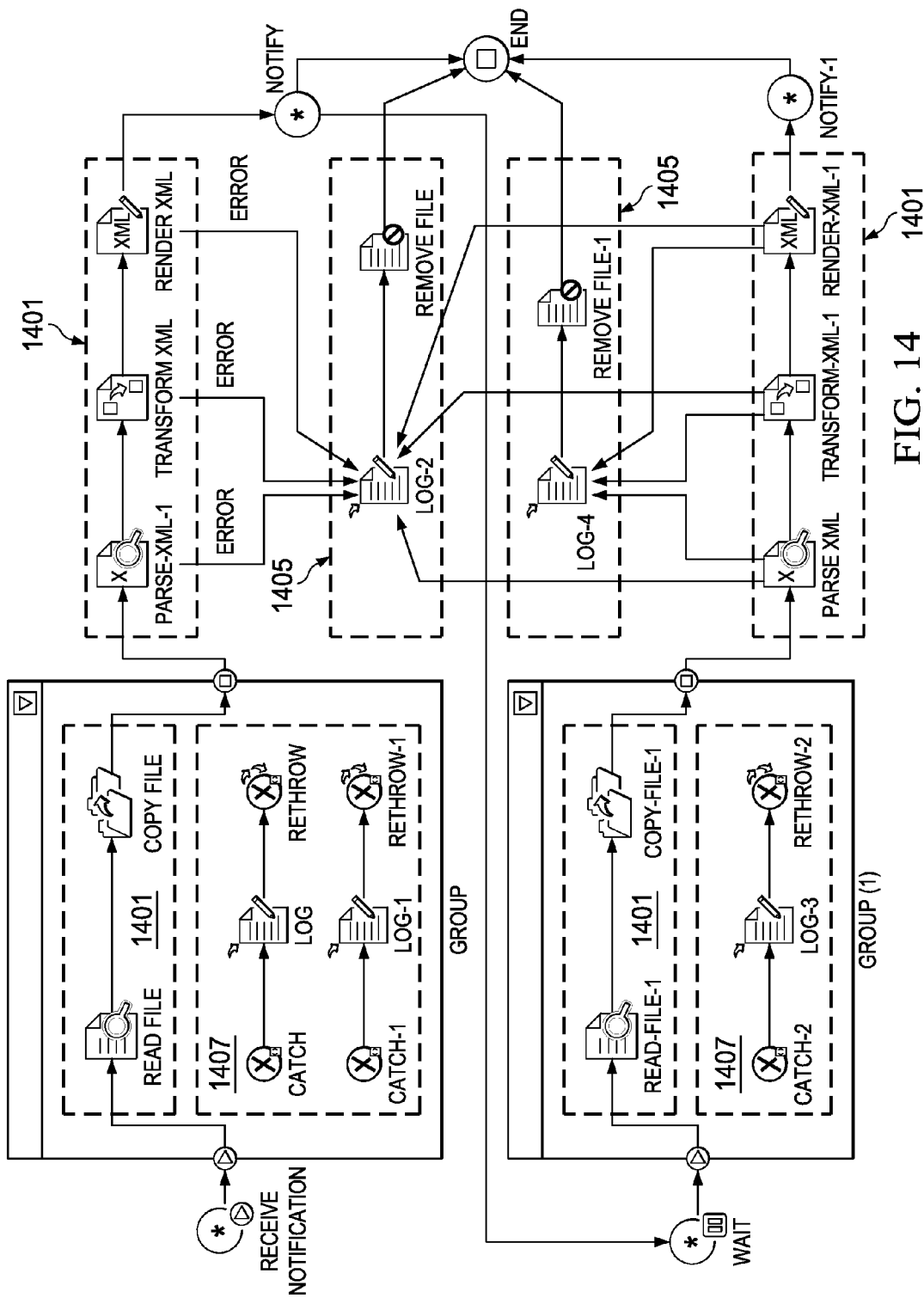
FIG. 14 is a flow diagram presented to developers using design tools of the prior art.

FIG. 14 is a flow diagram presented to developers using design tools of the prior art. In this view, primary logic representations 1401 are dispersed over the space of a visual development environment, among compensation logic representations 1405 and fault logic representations 1407.

Figure 15:
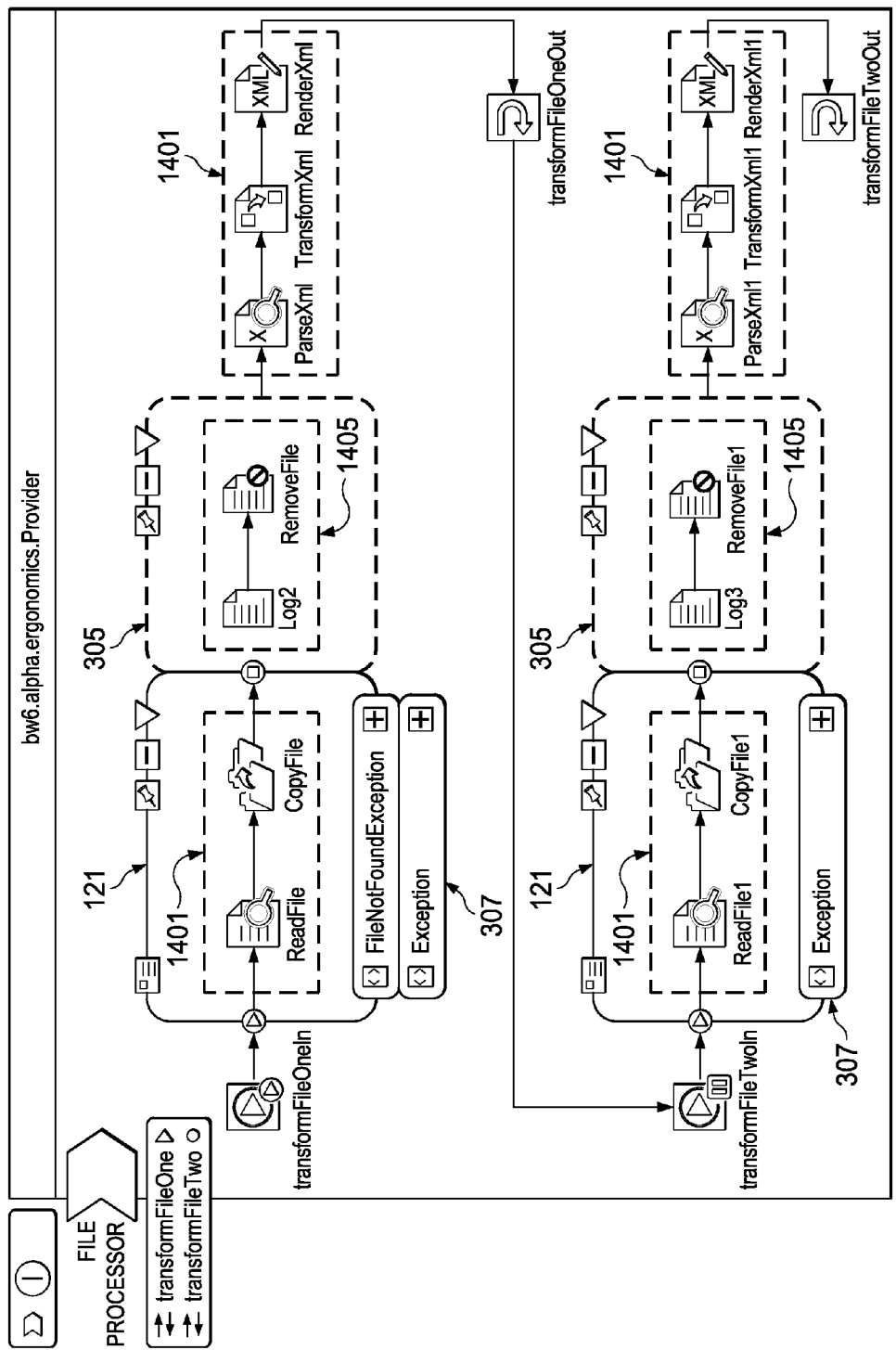
FIG. 15 is a flow diagram presented to developers using design tools of some embodiments of the present disclosure.

FIG. 15 is a flow diagram presented to developers using design tools of some embodiments of the present disclosure. The logic module under development may be the same as that of FIG. 14. Following the principles and techniques of the present disclosure, primary logic representations 1401 are presented either in scopes 121 or as stand-alone representations in the critical path. The fault logic representations are hidden from the developer within fault handler windows 307.

These fault handler windows 307 may be maximized by the developer as needed. The compensation logic representations 1405 are contained within the compensation handler windows 305.

Figure 16:
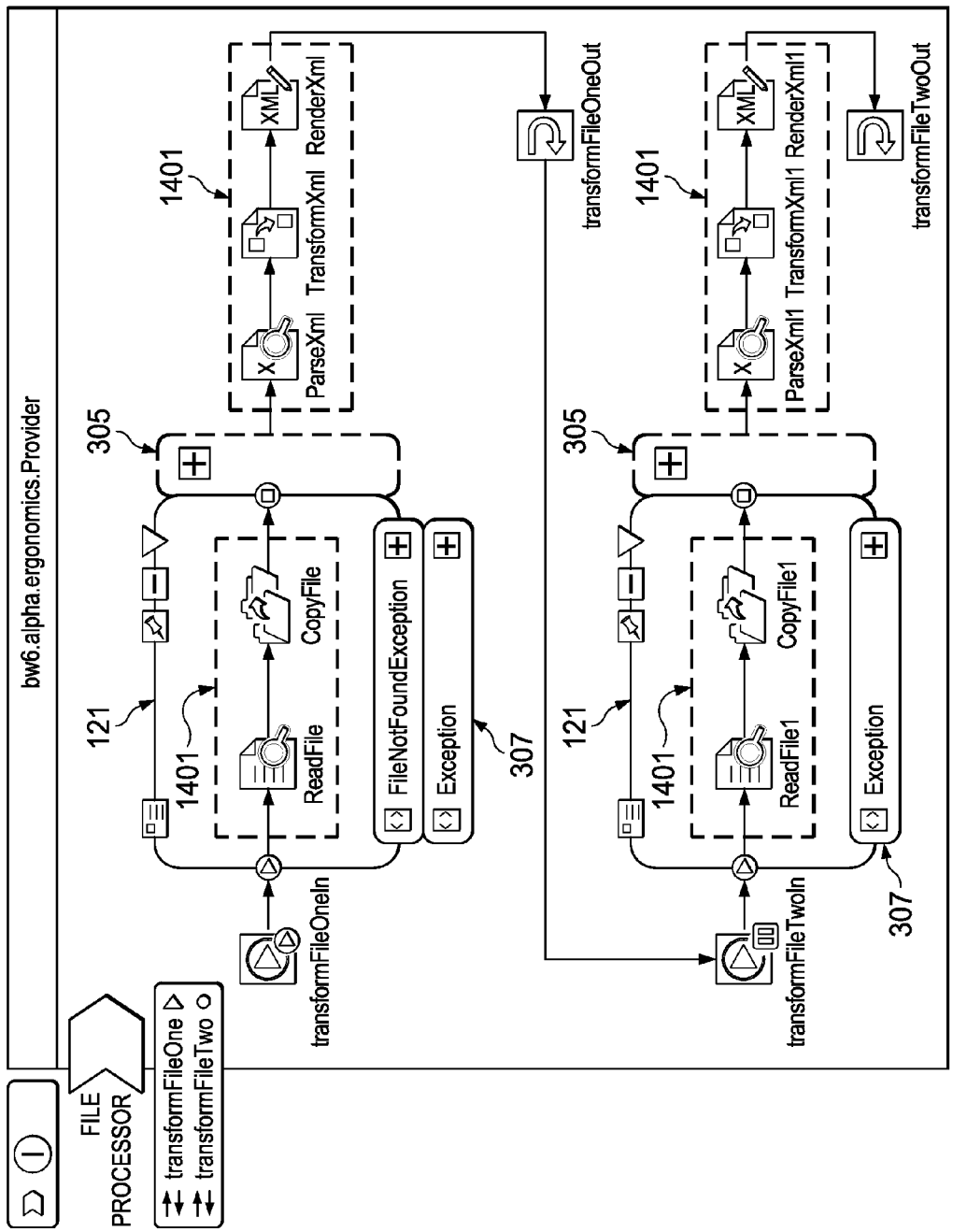
FIG. 16 is flow diagram presented to developers using design tools of the same embodiments as FIG. 15.

FIG. 16 is flow diagram presented to developers using design tools of the same embodiments as FIG. 15. If a developer does not need to focus on the compensation logic, they may minimize the compensation windows 305, which allows for an even less cluttered view of the critical path. This functionality of the visual development environment can greatly increase the productivity of developers, who may more easily direct their focus to the primary logic representations 1401.

Some preferred embodiments have been described in detail hereinabove. It is to be understood that the scope of the disclosure also comprehends embodiments different from those described, yet within the scope of the claims. The terminology employed herein is for the purposes of description and not of limitation. Words of inclusion are to be interpreted as non-exhaustive in considering the scope of the disclosure. Where the verb "may" appears, it is intended to convey an optional and/or permissive condition, but its use is not intended to suggest any lack of operability unless otherwise indicated. Persons skilled in the art may make various changes in the methods used to enable the system presently disclosed.

As referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances. Such a machine or engine may represent and/or include any form of processing component, including general purpose computers, dedicated microprocessors, or other processing devices capable of processing electronic information. Examples of a processor include digital signal processors (DSPs), application-specific integrated circuits (ASICs), field-programmable gate arrays (FPGAs), and any other suitable specific or general purpose processors.

Machine-readable media may comprise any collection and arrangement of volatile and/or non-volatile memory components suitable for storing data. For example, machine-readable media may comprise random access memory (RAM) devices, read only memory (ROM) devices, magnetic storage devices, optical storage devices, and/or any other suitable data storage devices. Machine-readable media may represent any number of memory components within, local to, and/or accessible by a processor.

Resources may encompass any types of resources for running logic modules including hardware (such as servers, clients, mainframe computers, networks, network storage, data sources, memory, central processing unit time, scientific instruments, and other computing devices), as well as software, software licenses, available network services, and other non-hardware resources, or a combination thereof.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

The title, background, and headings are provided in compliance with regulations and/or for the convenience of the reader. They include no admissions as to the scope and content of prior art and no limitations applicable to all disclosed embodiments.

What is claimed is:

1. A visual development environment apparatus for facilitating development of a logic module, the logic module operable to be instantiated on a server, the visual development environment apparatus being used for constructing a visual development environment operable to be displayed at a development terminal based on instructions stored in a non-volatile machine-readable medium and comprising:
   a processor configured for:
   receiving, by the visual development environment apparatus, a first design-time packet comprising a design-time representation of primary logic for a critical path for inclusion in the logic module and a design-time representation of secondary logic for inclusion in the logic module;
   interpreting, by the visual development environment apparatus, the first design-time packet for displaying the design-time representation of primary logic and the design-time representation of secondary logic;
   displaying:
      a primary window comprising the design-time representation of primary logic for the critical path to be included in the logic module, the critical path comprising an explicit segment being drawn by the visual development environment apparatus, and an implicit segment being selectively visible based on a user preference; and
      one or more secondary windows each comprising the design-time representation of secondary logic to be included in the logic module;
   hiding at least one of the one or more secondary windows when the primary window is displayed;
   facilitating at least one of retrieval, modification, and storage of instructions representing the logic module; and
   sending, by the visual development environment apparatus, a feedback design-time packet.

2. The visual development environment apparatus of claim 1, wherein the one or more secondary windows comprise a fault handler window and the secondary logic comprises fault logic that is operable to be triggered by one or more faults after the logic module is instantiated on the server.

3. The visual development environment apparatus of claim 1, wherein the one or more secondary windows comprise a compensation handler window and the secondary logic comprises compensation logic that is operable to compensate, at least in part, the primary logic after the logic module is instantiated on the server.

4. The visual development environment apparatus of claim 1, wherein the one or more secondary windows comprise an event handler window and the secondary logic comprises event logic that is operable to be conditionally executed after the logic module is instantiated on the server.

5. The visual development environment apparatus of claim 4, wherein the event logic is operable to be triggered by at least one of a user interaction and a timer.

6. The visual development environment apparatus of claim 1, wherein the hiding of the one or more secondary windows comprises minimizing the one or more secondary windows.

7. The visual development environment apparatus of claim 1, wherein at least one of the one or more secondary windows is visually presented as at least one of adjacent to, inside of, or hanging off of the primary window.

8. The visual development environment apparatus of claim 1, wherein at least one of the one or more secondary windows is at least partially transparent when the at least one of the one or more secondary windows is not focused upon.

9. The visual development environment apparatus of claim 1, further comprising:
   a second primary window; and
   a connection for the critical path between the primary window and the second primary window.

10. The visual development environment apparatus of claim 1, wherein the visual development environment apparatus is further operable to selectively minimize the primary window when at least one of the one or more secondary windows is displayed.

11. The visual development environment apparatus of claim 1, wherein the server is a cloud-based server.

12. A method of facilitating development of a logic module operable to be instantiated on a server, the method comprising:
   receiving, by a visual development environment apparatus, a first design-time packet comprising a design-time representation of primary logic for a critical path for inclusion in the logic module and a design-time representation of secondary logic for inclusion in the logic module;
   interpreting, by the visual development environment apparatus, the first design-time packet for displaying the design-time representation of primary logic and the design-time representation of secondary logic;
   displaying, by the visual development environment apparatus, a primary window comprising the design-time representation of primary logic for the critical path to be included in the logic module;
   drawing, by the visual development environment apparatus, an explicit segment of the critical path;
   determining, by the visual development environment apparatus, a user preference for an implicit segment of the critical path;
   determining, by the visual development environment apparatus, whether to display the implicit segment based on the user preference;
   displaying, by the visual development environment apparatus, one or more secondary windows each comprising the design-time representation of secondary logic to be included in the logic module;
   hiding, by the visual development environment apparatus, at least one of the one or more secondary windows when the primary window is displayed,
   wherein the visual development environment apparatus is further operable to facilitate at least one of retrieval, modification, and storage of instructions representing the logic module; and
   sending, by the visual development environment apparatus, a second design-time packet based on user input.

13. The method of claim 12, wherein the one or more secondary windows comprise a fault handler window and the secondary logic comprises fault logic that is operable to be triggered by one or more faults after the logic module is instantiated on the server.

14. The method of claim 12, wherein the one or more secondary windows comprise a compensation handler window and the secondary logic comprises compensation logic that is operable to compensate, at least in part, the primary logic after the logic module is instantiated on the server.

15. The method of claim 12, wherein the one or more secondary windows comprise an event handler window and the secondary logic comprises event logic that is operable to be conditionally executed after the logic module is instantiated on the server.

16. The method of claim 15, wherein the event logic is operable to be triggered by at least one of a user interaction and a timer.

17. The method of claim 12, wherein the hiding of the one or more secondary windows comprises minimizing the one or more secondary windows.

18. The method of claim 12, wherein at least one of the one or more secondary windows is visually presented as at least one of adjacent to, inside of, or hanging off of the primary window.

19. The method of claim 12, wherein at least one of the one or more secondary windows is at least partially transparent when the at least one of the one or more secondary windows is not focused upon.

20. The method of claim 12, further comprising:
   displaying, by the visual development environment apparatus, a second primary window; and
   displaying, by the visual development environment apparatus, a connection for the critical path between the primary window and the second primary window.

* * * * *